US012696260B2

(12) United States Patent
Chetlur Ravi et al.

(10) Patent No.: US 12,696,260 B2
(45) Date of Patent: Jul. 28, 2026

(54) TECHNIQUES FOR DETERMINING A TRAFFIC STREAM FOR A SEMI-PERSISTENT SCHEDULING FLOW

(71) Applicant: QUALCOMM Incorporated, San Diego, CA (US)

(72) Inventors: Vishnu Vardhan Chetlur Ravi, San Diego, CA (US); Abolfazl Hajisami, Escondido, CA (US); Xiao Feng Wang, San Diego, CA (US); Vincent Douglas Park, Alexandria, VA (US)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 18/336,851

(22) Filed: Jun. 16, 2023

(65) Prior Publication Data

US 2024/0422762 A1 Dec. 19, 2024

(51) Int. Cl.
*H04W 72/11* (2023.01)
*H04W 72/566* (2023.01)

(52) U.S. Cl.
CPC .......... *H04W 72/11* (2023.01); *H04W 72/566* (2023.01)

(58) Field of Classification Search
CPC .... H04W 72/11; H04W 72/566; H04W 72/02
See application file for complete search history.

(56) References Cited

U.S. PATENT DOCUMENTS

| | | | |
|---|---|---|---|
| 8,611,251 B2 * | 12/2013 | Subramanian | .......... H04L 45/03 370/254 |
| 2016/0381491 A1 * | 12/2016 | Watfa | ...................... H04W 4/70 455/41.2 |
| 2018/0049193 A1 | 2/2018 | Belleschi et al. | |
| 2023/0008530 A1 * | 1/2023 | Sharma | ................. H04L 1/0009 |

FOREIGN PATENT DOCUMENTS

EP 3395109 B1 5/2020

OTHER PUBLICATIONS

International Search Report and Written Opinion—PCT/US2024/030530—ISA/EPO—Sep. 5, 2024.

* cited by examiner

*Primary Examiner* — Kevin M Cunningham
(74) *Attorney, Agent, or Firm* — Harrity & Harrity/Qualcomm Incorporated

(57) ABSTRACT

Various aspects of the present disclosure generally relate to wireless communication. In some aspects, a user equipment (UE) may determine a traffic stream, from among a plurality of traffic streams, for a semi-persistent scheduling (SPS) flow of a plurality of SPS flows based at least in part on one or more parameters associated with the traffic stream, wherein the one or more parameters include one or more of a periodicity associated with the traffic stream, a number of frequency resources associated with the traffic stream, or a proximity service per packet priority (PPPP) value associated with the traffic stream, and wherein a number of the plurality of traffic streams is greater than a number of the (Continued)

500 ⟶ plurality of SPS flows. The UE may transmit traffic of the
traffic stream in accordance with the SPS flow. Numerous
other aspects are described.

30 Claims, 9 Drawing Sheets

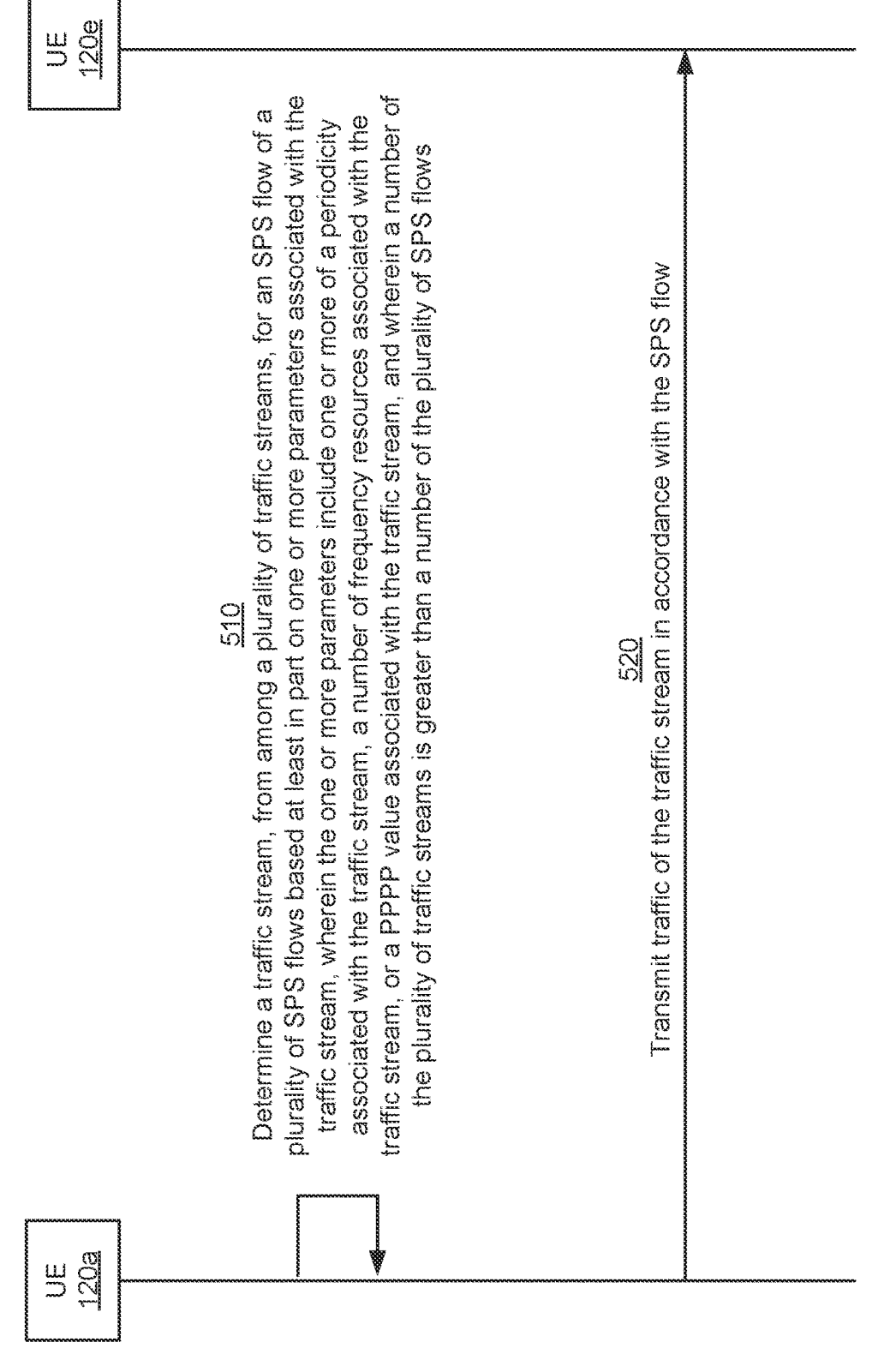

510

Determine a traffic stream, from among a plurality of traffic streams, for an SPS flow of a plurality of SPS flows based at least in part on one or more parameters associated with the traffic stream, wherein the one or more parameters include one or more of a periodicity associated with the traffic stream, a number of frequency resources associated with the traffic stream, or a PPPP value associated with the traffic stream, and wherein a number of the plurality of traffic streams is greater than a number of the plurality of SPS flows

520

Transmit traffic of the traffic stream in accordance with the SPS flow

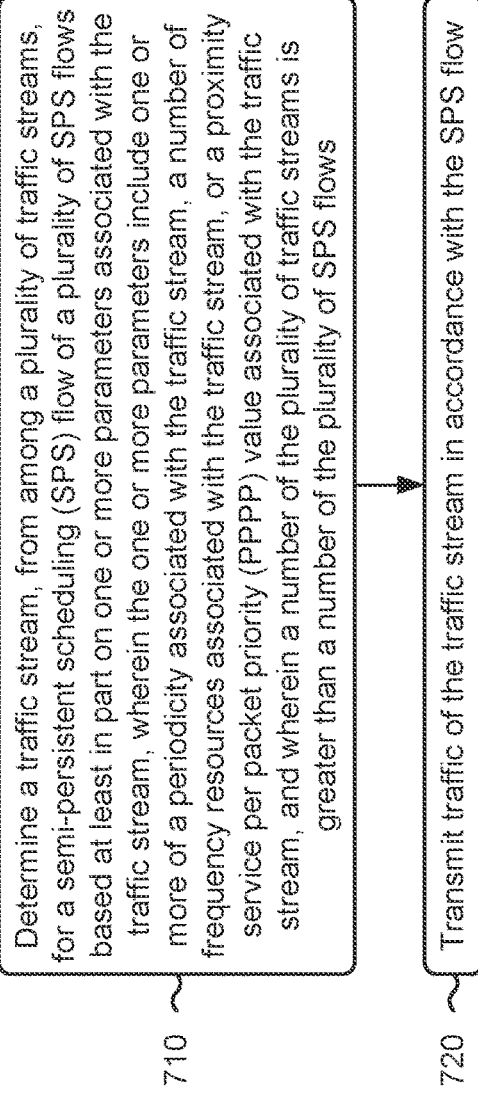

710 — Determine a traffic stream, from among a plurality of traffic streams, for a semi-persistent scheduling (SPS) flow of a plurality of SPS flows based at least in part on one or more parameters associated with the traffic stream, wherein the one or more parameters include one or more of a periodicity associated with the traffic stream, a number of frequency resources associated with the traffic stream, or a proximity service per packet priority (PPPP) value associated with the traffic stream, and wherein a number of the plurality of traffic streams is greater than a number of the plurality of SPS flows

720 — Transmit traffic of the traffic stream in accordance with the SPS flow

TECHNIQUES FOR DETERMINING A TRAFFIC STREAM FOR A SEMI-PERSISTENT SCHEDULING FLOW

FIELD OF THE DISCLOSURE

Aspects of the present disclosure generally relate to wireless communication and to techniques and apparatuses for determining a traffic stream for a semi-persistent scheduling (SPS) flow.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

Some aspects described herein relate to a user equipment (UE) for wireless communication. The UE may include one or more memories and one or more processors coupled to the one or more memories. The one or more processors may be configured to determine a traffic stream, from among a plurality of traffic streams, for a semi-persistent scheduling (SPS) flow of a plurality of SPS flows based at least in part on one or more parameters associated with the traffic stream, wherein the one or more parameters include one or more of a periodicity associated with the traffic stream, a number of frequency resources associated with the traffic stream, or a proximity service per packet priority (PPPP) value associated with the traffic stream, and wherein a number of the plurality of traffic streams is greater than a number of the plurality of SPS flows. The one or more processors may be configured to transmit traffic of the traffic stream in accordance with the SPS flow.

Some aspects described herein relate to a method of wireless communication performed by a UE. The method may include determining a traffic stream, from among a plurality of traffic streams, for an SPS flow of a plurality of SPS flows based at least in part on one or more parameters associated with the traffic stream, wherein the one or more parameters include one or more of a periodicity associated with the traffic stream, a number of frequency resources associated with the traffic stream, or a PPPP value associated with the traffic stream, and wherein a number of the plurality of traffic streams is greater than a number of the plurality of SPS flows. The method may include transmitting traffic of the traffic stream in accordance with the SPS flow.

Some aspects described herein relate to a non-transitory computer-readable medium that stores a set of instructions for wireless communication by a UE. The set of instructions, when executed by one or more processors of the UE, may cause the UE to determine a traffic stream, from among a plurality of traffic streams, for an SPS flow of a plurality of SPS flows based at least in part on one or more parameters associated with the traffic stream, wherein the one or more parameters include one or more of a periodicity associated with the traffic stream, a number of frequency resources associated with the traffic stream, or a PPPP value associated with the traffic stream, and wherein a number of the plurality of traffic streams is greater than a number of the plurality of SPS flows. The set of instructions, when executed by one or more processors of the UE, may cause the UE to transmit traffic of the traffic stream in accordance with the SPS flow.

Some aspects described herein relate to an apparatus for wireless communication. The apparatus may include means for determining a traffic stream, from among a plurality of traffic streams, for an SPS flow of a plurality of SPS flows based at least in part on one or more parameters associated with the traffic stream, wherein the one or more parameters include one or more of a periodicity associated with the traffic stream, a number of frequency resources associated with the traffic stream, or a PPPP value associated with the traffic stream, and wherein a number of the plurality of traffic streams is greater than a number of the plurality of SPS flows. The apparatus may include means for transmitting traffic of the traffic stream in accordance with the SPS flow.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a description, briefly summarized above, may be had by reference to aspects, some of which are illustrated in the appended drawings. It is to be noted, however, that the appended drawings illustrate only typical aspects of this disclosure and are therefore not to be considered limiting of its scope, for the description may admit to other equally effective aspects. The same reference numbers in different drawings may identify the same or similar elements.

FIG. 5 is a diagram illustrating an example associated with determining a traffic stream with an SPS flow, in accordance with the present disclosure.

FIG. 7 is a diagram illustrating an example process performed, for example, by a UE, in accordance with the present disclosure.

DETAILED DESCRIPTION

Figure 1:
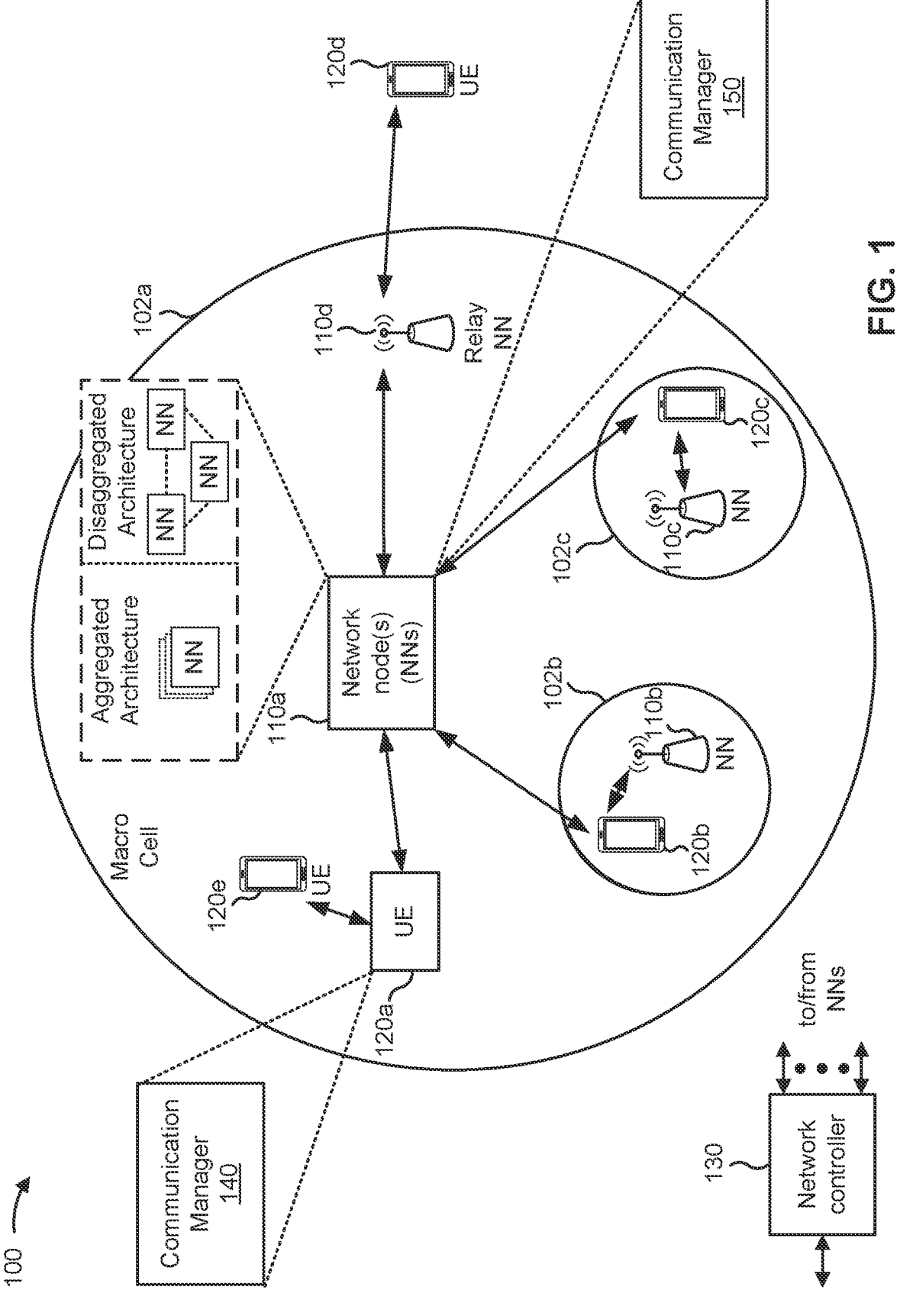
FIG. 1 is a diagram illustrating an example of a wireless network.

Semi-persistent scheduling (SPS) communications may include periodic communications that are configured for a user equipment (UE). SPS avoids separate control information to schedule each periodic communication, thereby conserving signaling overhead. In some examples, such as in vehicle-to-everything (V2X) environments, one or more SPS flows (e.g., one or more SPS resources) can be established for peer-to-peer (P2P) communications between V2X-capable UEs.

In some cases, the number of SPS flows that can be allocated for distinct traffic streams is limited. For example, if the number of SPS flows is limited to two, then only two traffic streams can be assigned to respective SPS flows, and any remaining traffic streams cannot be assigned to an SPS flow. Traffic streams that are not assigned to an SPS flow can be sent via one-shot transmissions, which may be susceptible to interference (e.g., due to packet collisions).

In some examples, assigning, to an SPS flow, a traffic stream that has higher periodicity (e.g., larger period and lower frequency) than another traffic stream can cause the other traffic stream to be assigned to one-shot transmissions, which may increase the chance of the other traffic stream experiencing packet collisions due to the lower periodicity (e.g., higher frequency) of one-shot transmissions of the other traffic stream. In some examples, assigning, to an SPS flow, a traffic stream associated with a smaller number of frequency resources than another traffic stream can cause the other traffic stream to be assigned to one-shot transmissions, which may increase the chance of the other traffic stream experiencing packet collisions due to the larger number of frequency resources occupied for the one-shot transmissions. In some examples, assigning, to an SPS flow, a traffic stream having a lower priority than another traffic stream may cause the higher-priority traffic stream to be assigned to one-shot transmissions, which may increase the chance of the higher-priority traffic stream experiencing packet collisions in one-shot transmissions.

Various aspects relate generally to wireless communication and more specifically to SPS flows. Some aspects more specifically relate to determining a traffic stream for an SPS flow. In some examples, a UE may determine (e.g., assign, allocate, identify, choose, select, or the like) a traffic stream, from among a plurality of traffic streams, for an SPS flow of a plurality of SPS flows. The number (e.g., quantity) of the plurality of traffic streams may be greater than a number of the plurality of SPS flows. The UE may determine the traffic stream based at least in part on one or more parameters associated with the traffic stream. The one or more parameters may include one or more of a periodicity associated with the traffic stream, a number of frequency resources associated with the traffic stream, or a proximity service per packet priority (PPPP) value associated with the traffic stream.

In some examples, the UE may determine the traffic stream for the SPS flow based at least in part on the periodicity associated with the traffic stream being less than another periodicity associated with another traffic stream of the plurality of traffic streams. In some examples, the UE may determine the traffic stream for the SPS flow based at least in part on the number of frequency resources associated with the traffic stream being greater than another number of frequency resources associated with another traffic stream of the plurality of traffic streams. In some examples, the UE may determine the traffic stream for the SPS flow based at least in part on the PPPP value associated with the traffic stream being less than another PPPP value associated with another traffic stream of the plurality of traffic streams.

Aspects of the subject matter described in this disclosure can be implemented to realize one or more of the following potential advantages. In some examples, by determining the traffic stream based at least in part on the one or more parameters associated with the traffic stream, the described techniques can be used to determine which traffic stream(s) to assign to SPS flow(s) and which traffic streams to assign to one-shot transmissions. For example, the traffic stream determined for the SPS flow may experience improved performance (e.g., reduced interference, such as a reduced number of packet collisions) when transmitted via an SPS flow rather than via one-shot transmissions.

Determining the traffic stream for the SPS flow based at least in part on the periodicity associated with the traffic stream being less than the other periodicity associated with the other traffic stream may reduce the chance of the traffic stream experiencing packet collisions compared to the chance the traffic stream would experience packet collisions if the traffic stream were determined for one-shot transmissions. Determining the traffic stream for the SPS flow based at least in part on the number of frequency resources associated with the traffic stream being greater than the other number of frequency resources associated with the other traffic stream may reduce the chance of the traffic stream experiencing packet collisions compared to the chance the traffic stream would experience packet collisions if the traffic stream were determined for one-shot transmissions. Determining the traffic stream for the SPS flow based at least in part on the PPPP value associated with the traffic stream being less than the other PPPP value associated with the other traffic stream may help to reduce the probability of packet collisions resulting from one-shot transmissions of higher-priority traffic.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), or other entities. A network node 110 is an example of a network node that communicates with UEs 120. As shown, a network node 110 may include one or more network nodes.

For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (cMTC) UEs. An MTC UE or an eMTC UE may include, for example, a robot, an unmanned aerial vehicle, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a network node 110 as an intermediary to communicate with one another). For example, the UEs 120 may communicate using P2P communications, device-to-device (D2D) communications, a V2X protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHZ-7.125 GHz) and FR2 (24.25 GHZ-52.6 GHZ). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHZ), FR4 (52.6 GHZ-114.25 GHZ), and FR5 (114.25 GHZ-300 GHZ). Each of these higher frequency bands falls within the EHF band.

With these examples in mind, unless specifically stated otherwise, the term "sub-6 GHZ," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may determine a traffic stream, from among a plurality of traffic streams, for an SPS flow of a plurality of SPS flows based at least in part on one or more parameters associated with the traffic stream, wherein the one or more parameters include one or more of a periodicity associated with the traffic stream, a number of frequency resources associated with the traffic stream, or a PPPP value associated with the traffic stream, and wherein a number of the plurality of traffic streams is greater than a number of the plurality of SPS flows; and transmit traffic of the traffic stream in accordance with the SPS flow. Additionally, or alternatively, the communication manager 140 may perform one or more other operations described herein.

In some aspects, the network node 110 may include a communication manager 150. As described in more detail elsewhere herein, the communication manager 150 may determine a traffic stream, from among a plurality of traffic streams, for an SPS flow of a plurality of SPS flows based at least in part on one or more parameters associated with the traffic stream, wherein the one or more parameters include one or more of a periodicity associated with the traffic stream, a number of frequency resources associated with the traffic stream, or a PPPP value associated with the traffic stream, and wherein a number of the plurality of traffic streams is greater than a number of the plurality of SPS flows; and transmit traffic of the traffic stream in accordance with the SPS flow. Additionally, or alternatively, the communication manager 150 may perform one or more other operations described herein.

As indicated above, FIG. 1 is provided as an example. Other examples may differ from what is described with regard to FIG. 1.

Figure 2:
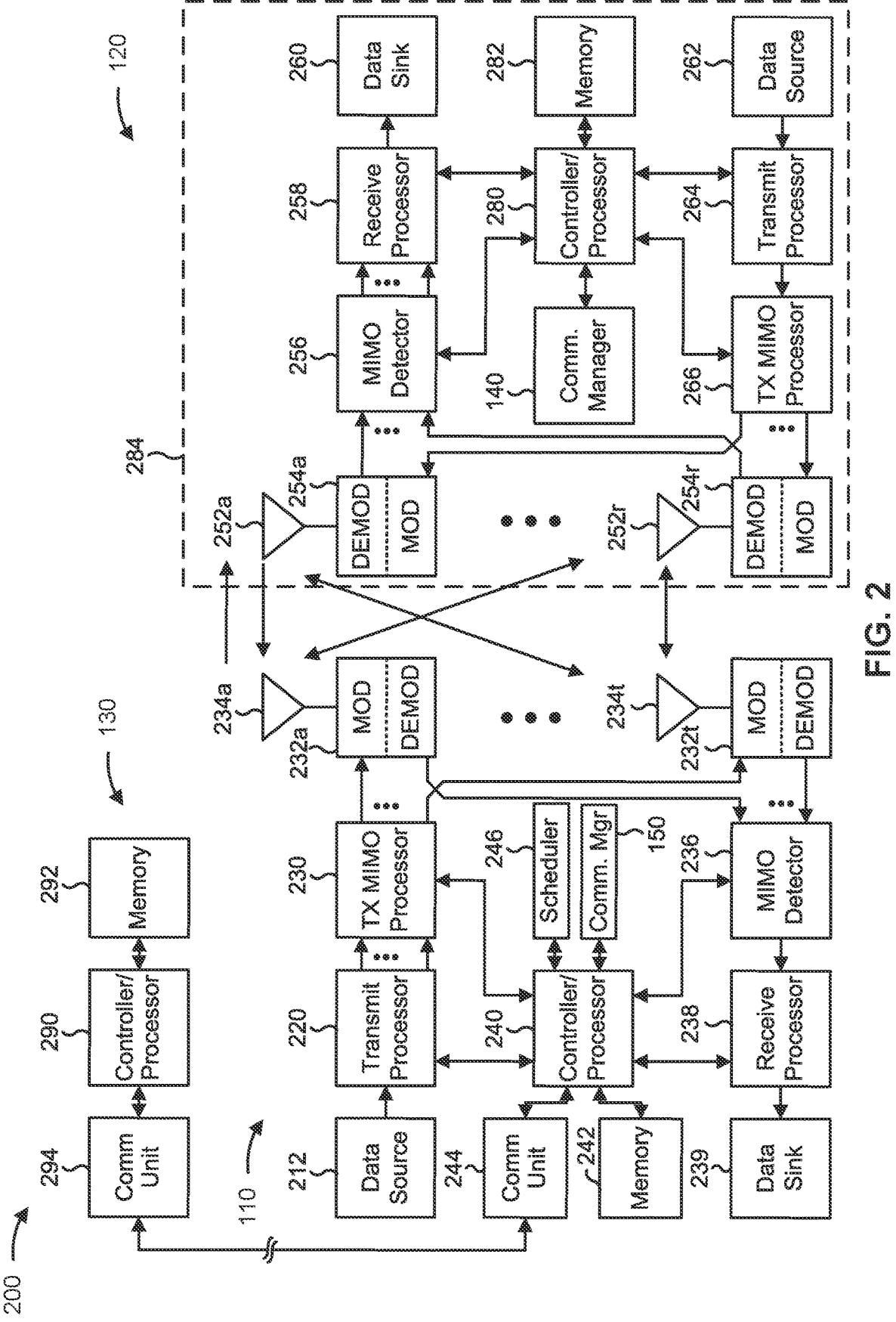
FIG. 2 is a diagram illustrating an example of a network node in communication with a user equipment (UE) in a wireless network.

FIG. 2 is a diagram illustrating an example 200 of a network node 110 in communication with a UE 120 in a wireless network 100. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 5-9).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 5-9).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with determining a traffic stream for an SPS flow, as described in more detail elsewhere herein. For example, the controller/processor 240 of the network node 110, the controller/processor 280 of the UE 120, or any other component(s) (or combinations of components) of FIG. 2 may perform or direct operations of, for example, process 700 of FIG. 7 and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 700 of FIG. 7 and/or other processes as described herein. In some examples, executing instructions may include running the instructions, converting the instructions, compiling the instructions, and/ or interpreting the instructions, among other examples.

In some aspects, the UE 120 includes means for determining a traffic stream, from among a plurality of traffic streams, for an SPS flow of a plurality of SPS flows based at least in part on one or more parameters associated with the traffic stream, wherein the one or more parameters include one or more of a periodicity associated with the traffic stream, a number of frequency resources associated with the traffic stream, or a PPPP value associated with the traffic stream, and wherein a number of the plurality of traffic streams is greater than a number of the plurality of SPS flows; and/or means for transmitting traffic of the traffic stream in accordance with the SPS flow. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for determining a traffic stream, from among a plurality of traffic streams, for a SPS flow of a plurality of SPS flows based at least in part on one or more parameters associated with the traffic stream, wherein the one or more parameters include one or more of a periodicity associated with the traffic stream, a number of frequency resources associated with the traffic stream, or a PPPP value associated with the traffic stream, and wherein a number of the plurality of traffic streams is greater than a number of the plurality of SPS flows; and/or means for transmitting traffic of the traffic stream in accordance with the SPS flow. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (CNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
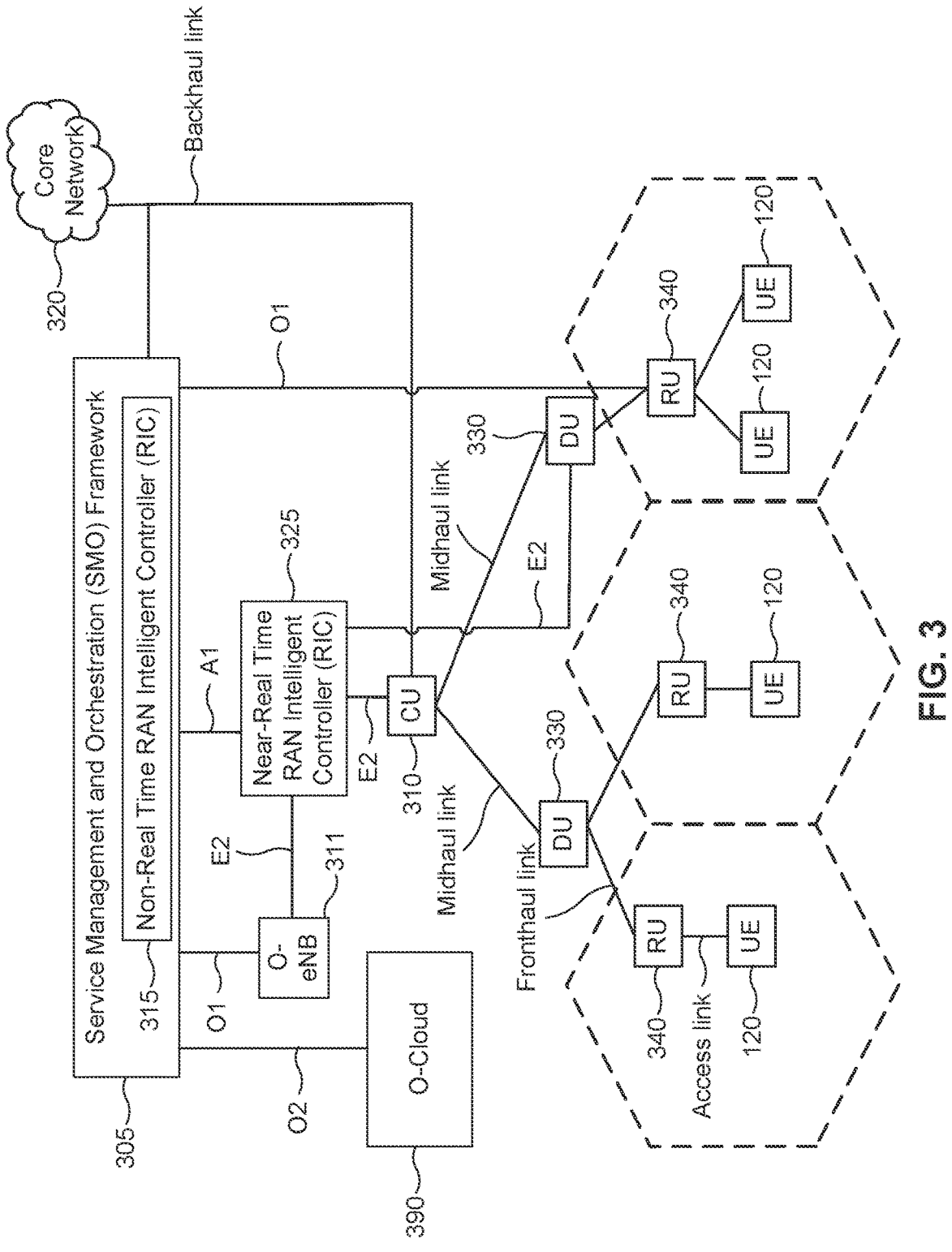
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
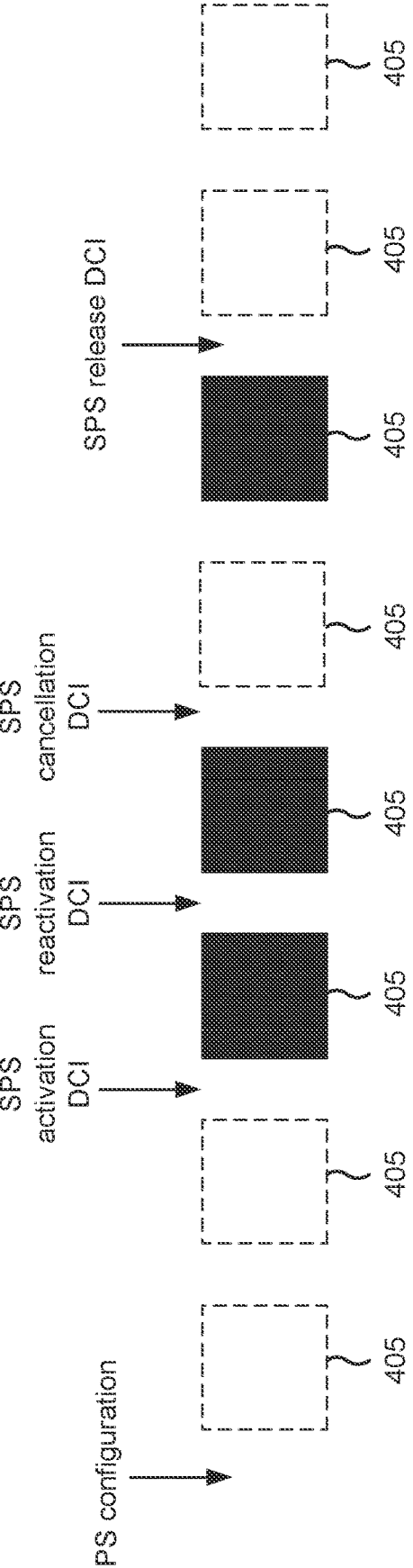
FIG. 4 is a diagram illustrating an example of downlink semi-persistent scheduling (SPS) communication, in accordance with the present disclosure.

FIG. 4 is a diagram illustrating an example 400 of downlink SPS communication, in accordance with the present disclosure. SPS communications May include periodic downlink communications that are configured for a UE, such that a network node does not need to transmit (e.g., directly or via one or more network nodes) separate downlink control information (DCI) to schedule each downlink communication, thereby conserving signaling overhead.

As shown in example 400, a UE may be configured with an SPS configuration for SPS communications. For example, the UE may receive the SPS configuration via a RRC message transmitted by a network node (e.g., directly or via one or more network nodes). The SPS configuration may indicate a resource allocation associated with SPS downlink communications (e.g., in a time domain, frequency domain, spatial domain, and/or code domain) and a periodicity at which the resource allocation is repeated, resulting in periodically reoccurring scheduled SPS occasions 405 for the UE. The SPS configuration may also configure hybrid automatic repeat request (HARQ)-acknowledgement (ACK) (HARQ-ACK) feedback resources for the UE to transmit HARQ-ACK feedback for SPS physical downlink shared channel (PDSCH) communications received in the SPS occasions 405. For example, the SPS configuration may indicate a PDSCH-to-HARQ feedback timing value, which may be referred to as a K1 value in a wireless communication standard (e.g., a 3GPP standard).

The network node may transmit SPS activation DCI to the UE (e.g., directly or via one or more network nodes) to activate the SPS configuration for the UE. The network node may indicate, in the SPS activation DCI, communication parameters, such as an MCS, a resource block (RB) allocation, and/or antenna ports, for the SPS PDSCH communications to be transmitted in the scheduled SPS occasions 405. The UE may begin monitoring the SPS occasions 405 based at least in part on receiving the SPS activation DCI. For example, beginning with a next scheduled SPS occasion 405 subsequent to receiving the SPS activation DCI, the UE may monitor the scheduled SPS occasions 405 to decode PDSCH communications using the communication parameters indicated in the SPS activation DCI. The UE may refrain from monitoring configured SPS occasions 405 prior to receiving the SPS activation DCI.

The network node may transmit SPS reactivation DCI to the UE (e.g., directly or via one or more network nodes) to change the communication parameters for the SPS PDSCH communications. Based at least in part on receiving the SPS reactivation DCI, the UE may begin monitoring the scheduled SPS occasions 405 using the communication parameters indicated in the SPS reactivation DCI. For example, beginning with a next scheduled SPS occasion 405 subsequent to receiving the SPS reactivation DCI, the UE may monitor the scheduled SPS occasions 405 to decode PDSCH communications based on the communication parameters indicated in the SPS reactivation DCI.

In some cases, such as when there is not downlink traffic to transmit to the UE, the network node may transmit SPS cancellation DCI to the UE (e.g., directly or via one or more network nodes) to temporarily cancel or deactivate one or more subsequent SPS occasions 405 for the UE. The SPS cancellation DCI may deactivate only a subsequent one SPS occasion 405 or a subsequent N SPS occasions 405 (where N is an integer). SPS occasions 405 after the one or more (e.g., N) SPS occasions 405 subsequent to the SPS cancellation DCI may remain activated. Based at least in part on receiving the SPS cancellation DCI, the UE may refrain from monitoring the one or more (e.g., N) SPS occasions 405 subsequent to receiving the SPS cancellation DCI. As shown in example 400, the SPS cancellation DCI cancels one subsequent SPS occasion 405 for the UE. After the SPS occasion 405 (or N SPS occasions) subsequent to receiving the SPS cancellation DCI, the UE may automatically resume monitoring the scheduled SPS occasions 405.

The network node may transmit SPS release DCI to the UE (e.g., directly or via one or more network nodes) to deactivate the SPS configuration for the UE. The UE may stop monitoring the scheduled SPS occasions 405 based at least in part on receiving the SPS release DCI. For example, the UE may refrain from monitoring any scheduled SPS occasions 405 until another SPS activation DCI is received by the UE. Whereas the SPS cancellation DCI may deactivate only a subsequent one SPS occasion 405 or a subsequent N SPS occasions 405, the SPS release DCI deactivates all subsequent SPS occasions 405 for a given SPS configuration for the UE until the given SPS configuration is activated again by a new SPS activation DCI.

In V2X environments, the SPS operations described above may be adapted to be performed by a UE (e.g., a roadside unit (RSU), an onboard unit (OBU), or the like), rather than a network node, for sidelink communication. Thus, a UE (e.g., a V2X-capable UE) may transmit, to another UE (e.g., another V2X-capable UE), via direct P2P communications, one or more traffic streams via one or more SPS flows. A traffic stream comprises a sequence of packets and an SPS flow comprises one or more SPS resources (e.g., SPS occurrences). For example, the traffic stream may include a given type of traffic (e.g., V2X traffic), such as basic safety messages (BSMs), signal phase and timing (SPaT) messages, map (MAP) messages, networked transport of radio technical commission for maritime services (RTCM) via IP (NTRIP) messages, or the like.

As indicated above, FIG. 4 is provided as an example. Other examples may differ from what is described with respect to FIG. 4.

In some cases, the number of SPS flows that can be allocated for distinct traffic streams is limited. For example, if the number of SPS flows is limited to two, then only two traffic streams can be assigned to respective SPS flows. However, if more than two traffic streams are available for assignment to the SPS flows, then at least one traffic stream cannot be assigned to an SPS flow. Traffic streams that are not assigned to an SPS flow can be sent via one-shot transmissions, which may be susceptible to interference (e.g., due to packet collisions).

In some examples, determining, for an SPS flow, a traffic stream that has higher periodicity (e.g., larger period and lower frequency) than another traffic stream can cause the other traffic stream to be assigned to one-shot transmissions, which may increase the chance of the other traffic stream experiencing packet collisions due to the lower periodicity (e.g., higher frequency) of one-shot transmissions of the other traffic stream. In some examples, assigning, to an SPS flow, a traffic stream associated with a smaller number of frequency resources than another traffic stream can cause the other traffic stream to be assigned to one-shot transmissions, which may increase the chance of the other traffic stream experiencing packet collisions due to the larger number of frequency resources occupied for the one-shot transmissions. In some examples, assigning, to an SPS flow, a traffic stream having a lower priority than another traffic stream may cause the higher-priority traffic stream to be assigned to one-shot transmissions, which may increase the chance of the higher-priority traffic stream experiencing packet collisions in one-shot transmissions.

FIG. 5 is a diagram illustrating an example 500 associated with determining a traffic stream with an SPS flow, in accordance with the present disclosure. As shown in FIG. 5, a UE 120*a* and a UE 120*e* may communicate with one another (e.g., via P2P direct communication). The UE 120*a* and/or the UE 120*e* may be V2X-capable devices, such as roadside units (RSUs), onboard units (OBUs), or the like.

As shown by reference number 510, the UE 120*a* may determine (e.g., assign, allocate, identify, choose, select, or the like) a traffic stream, from among a plurality of traffic streams, for an SPS flow of a plurality of SPS flows. The plurality of traffic streams may comprise respective sequences of packets (e.g., corresponding to respective applications). The plurality of SPS flows may comprise respective SPS resources. For example, first SPS resources may occur once every 100 milliseconds, and second SPS resources may occur once every 200 milliseconds.

In some examples, the number of the plurality of traffic streams may be greater than a number of the plurality of SPS flows. As a result, only a subset of the plurality of traffic streams can be determined for an SPS flow. In some examples, the number of the plurality of SPS flows may be two, and the number of the plurality of traffic streams may be N, where N is greater than two. Thus, only two out of the N traffic streams can be determined for an SPS flow.

The UE 120*a* may determine the traffic stream based at least in part on one or more parameters associated with the traffic stream. Thus, the UE 120*a* may make scheduling decisions regarding which SPS resources are to be used to transmit outgoing packets. The one or more parameters may include one or more of a periodicity associated with the traffic stream, a number of frequency resources associated with the traffic stream, or a PPPP value associated with the traffic stream.

Determining the traffic stream based at least in part on the one or more parameters associated with the traffic stream may enable the UE 120*a* to determine which of the N traffic streams to allocate for SPS flows and which traffic streams to allocate for one-shot transmissions. For example, the traffic stream determined based at least in part on the one or more parameters associated with the traffic stream may experience improved performance (e.g., reduced interference, such as a reduced number of packet collisions) when transmitted via an SPS flow rather than via one-shot transmissions.

In some examples, the one or more parameters include the periodicity associated with the traffic stream. The UE 120*a* may determine the traffic stream for the SPS flow based at least in part on the periodicity associated with the traffic stream being less than another periodicity associated with another traffic stream of the plurality of traffic streams. For example, traffic of the traffic stream may be transmitted with a lower period (e.g., a higher frequency) than the other traffic stream is transmitted with. For example, the UE 120*a* may determine, for the SPS flow, a traffic stream associated with a frequency of one message per 100 millisecond over a traffic stream associated with a frequency of 1 message per second. In some examples, traffic streams that are not periodic are excluded from consideration for assignment to an SPS flow.

Determining the traffic stream for the SPS flow based at least in part on the periodicity associated with the traffic stream being less than the other periodicity associated with the other traffic stream may reduce the chance of the traffic stream experiencing packet collisions, as compared to the chance the traffic stream would experience packet collisions if the traffic stream were determined for one-shot transmissions. For example, because the traffic stream has a low periodicity (e.g., more frequent transmissions than the other traffic stream), the traffic stream may experience fewer packet collisions when transmitted via the SPS flow than the traffic stream would experience when transmitted via the one-shot transmissions.

In some examples, the one or more parameters include the number of frequency resources associated with the traffic stream (e.g., a packet size associated with traffic of the traffic stream). The number of frequency resources may be the number of frequency resources involved in transmitting traffic of the traffic stream (e.g., the number of frequency resources occupied by the traffic). In some examples, the frequency resources may be resource blocks. In some examples, the frequency resources may be subchannels.

The UE 120*a* may determine the traffic stream for the SPS flow based at least in part on the number of frequency resources associated with the traffic stream being greater than another number of frequency resources associated with another traffic stream of the plurality of traffic streams. The UE 120*a* may consider the minimum number of subchannels required to transmit a packet rather than comparing packet sizes directly.

Determining the traffic stream for the SPS flow based at least in part on the number of frequency resources associated with the traffic stream being greater than the other number of frequency resources associated with the other traffic stream may reduce the chance of the traffic stream experiencing packet collisions as compared to the chance the traffic stream would experience packet collisions if the traffic stream were determined for one-shot transmissions. For example, because the traffic stream is associated with many frequency resources (e.g., more frequency resources than the other traffic stream), the traffic stream may experience fewer packet collisions when transmitted via the SPS flow than the traffic stream would experience when transmitted via the one-shot transmissions. Thus, by prioritizing traffic with larger packet sizes (e.g., requiring more frequency resources) for assignment to an SPS flow, the UE 120*a* may reduce the chance of packet collisions resulting from one-shot transmissions of traffic with larger packet sizes (e.g., requiring many frequency resources).

In some examples, the one or more parameters include the PPPP value associated with the traffic stream. The UE 120*a* may determine the traffic stream for the SPS flow based at least in part on the PPPP value associated with the traffic stream being less than another PPPP value associated with another traffic stream of the plurality of traffic streams. The PPPP values may range from 1 to 8, with 1 being the highest priority and 8 being the lowest priority.

Determining the traffic stream for the SPS flow based at least in part on the PPPP value associated with the traffic stream being less than the other PPPP value associated with the other traffic stream may help to reduce the probability of packet collisions resulting from one-shot transmissions of higher-priority traffic. For example, because the PPPP value associated with the traffic stream is less than the other PPPP value associated with the other traffic stream, the traffic stream may be higher priority than the other traffic stream. Thus, the (higher-priority) traffic stream may be transmitted in the SPS flow, and the other (lower-priority) traffic stream may be transmitted via one-shot transmissions.

An example procedure for determining the traffic stream for the SPS flow is provided as follows. In some aspects, the UE 120*a* may determine the traffic stream for the SPS flow based at least in part on the number of frequency resources associated with the traffic stream and the periodicity associated with the traffic stream. The frequency resources may be subchannels associated with (e.g., required to transmit) the traffic stream.

The UE 120*a* may determine the traffic stream for the SPS flow based at least in part on a subchannel rate associated with the traffic stream being higher than another subchannel rate associated with another traffic stream. The subchannel rate may be based at least in part on the number of subchannels associated with the traffic stream and the periodicity associated with the traffic stream. The subchannel rate may be a number of subchannels required per second (NSCRPS). For example, the UE 120*a* may calculate the NSCRPS by combining the number of subchannels associated with the traffic stream and the periodicity associated with the traffic stream. For example, the UE 120*a* may divide the number of subchannels associated with the traffic stream by the periodicity associated with the traffic stream. For example, BSM traffic may require 2 subchannels for each transport block and have a periodicity of 100 millisec-onds. Therefore, BSM traffic may be associated with an NSCRPS of 20.

In some examples, the UE 120*a* may rank the plurality of traffic streams (T1, T2, . . . . Tn) based at least in part on respective subchannel rates associated with the plurality of traffic streams. For example, the traffic streams may have NSCRPS values of 20, 30, and 50. The UE 120*a* may rank traffic streams in descending order of NSCRPS values. For example, the UE 120*a* may assign a rank 1 to all streams with an NSCRPS value of 50, a rank 2 to all streams with an NSCRPS value of 30, and a rank 3 to all streams with an NSCRPS value of 20. Ranking the plurality of traffic streams based at least in part on respective subchannel rates associated with the plurality of traffic streams may enable the UE to determine which traffic stream(s) to assign to an SPS flow.

The UE 120*a* may rank traffic streams, of the plurality of traffic streams, that are associated with equal subchannel rates based at least in part on priority classifications associated with the traffic streams associated with equal subchannel rates. For example, the priority classifications may be based at least in part on PPPP values associated with the traffic streams associated with equal subchannel rates. For example, the UE 120*a* may classify any traffic stream with a PPPP value of 1-5 as "high priority" and any traffic stream with a PPPP value of 6-8 as "low priority." Thus, each traffic stream may be characterized by the NSCRPS and PPPP values. Ranking traffic streams that are associated with equal subchannel rates based at least in part on priority classifi-cations associated with the traffic streams associated with equal subchannel rates may enable the UE to determine which traffic stream(s) to assign to an SPS flow in the event that multiple traffic streams have equal subchannel rates.

The UE 120*a* may rank traffic streams, of the traffic streams associated with equal subchannel rates, that are associated with identical priority classifications based at least in part on periodicities associated with the traffic streams associated with identical priority classifications. Thus, for example, if the UE 120*a* assigns, based on the NSCRPS, the same rank level to multiple traffic streams (e.g., if multiple traffic streams have rank 1, or if one traffic stream has rank 1 and multiple traffic streams have rank 2), then the UE 120*a* may resolve the tie by examining the PPPP values and/or periodicities of the traffic streams. For example, the UE 120*a* may refine the ranking of the traffic streams with the same NSCRPS-based rank according to the following ranking hierarchy:

(i) High priority, Lower periodicity—Rank 1

(ii) High priority, Higher periodicity—Rank 2

(iii) Low priority, Lower periodicity—Rank 3

(iv) Low priority, Higher periodicity—Rank 4

Ranking traffic streams, of the traffic streams associated with equal subchannel rates, that are associated with iden-tical priority classifications based at least in part on period-icities associated with the traffic streams associated with identical priority classifications may enable the UE to deter-mine which traffic stream(s) to assign to an SPS flow in the event that multiple traffic streams have equal subchannel rates and equal priority classifications.

After assigning the rankings as described above, the UE 120*a* may determine the traffic streams with the highest rankings for the SPS flows. For example, if the number of SPS flows is limited to two, then the UE 120*a* may choose the top-two-ranked traffic streams for the SPS flows. Thus, by examining the potential impact of each parameter, the UE 120*a* may award an appropriate ranking to each traffic stream according to various combinations of parameters associated with the traffic stream. If, after attempting to resolve the tie by refining the rankings, the UE 120*a* assigns the same rank (e.g., rank 1 or rank 2) to more than two traffic streams, then the UE 120*a* may arbitrarily choose the traffic stream(s), from among the traffic streams with the same rank, for the SPS flow.

As shown by reference number 520, the UE 120*a* may transmit traffic of the traffic stream in accordance with the SPS flow. For example, if the UE 120*a* transmits the traffic once every X milliseconds, then the SPS flow may be associated with one or more resources that occur once every X milliseconds. For example, if the number of SPS flows is limited to two, and the UE 120*a* determines a first traffic stream for a first SPS flow associated with one or more resources that occur once every 100 milliseconds and a second traffic stream for a second SPS flow associated with one or more resources that occur once every 200 milliseconds, then the UE 120a may transmit the traffic of the first traffic stream once every 100 milliseconds and the traffic of the second traffic stream once every 200 milliseconds. The UE 120a may transmit other traffic streams as one-shot transmissions.

As indicated above, FIG. 5 is provided as an example. Other examples may differ from what is described with respect to FIG. 5.

Figure 6:
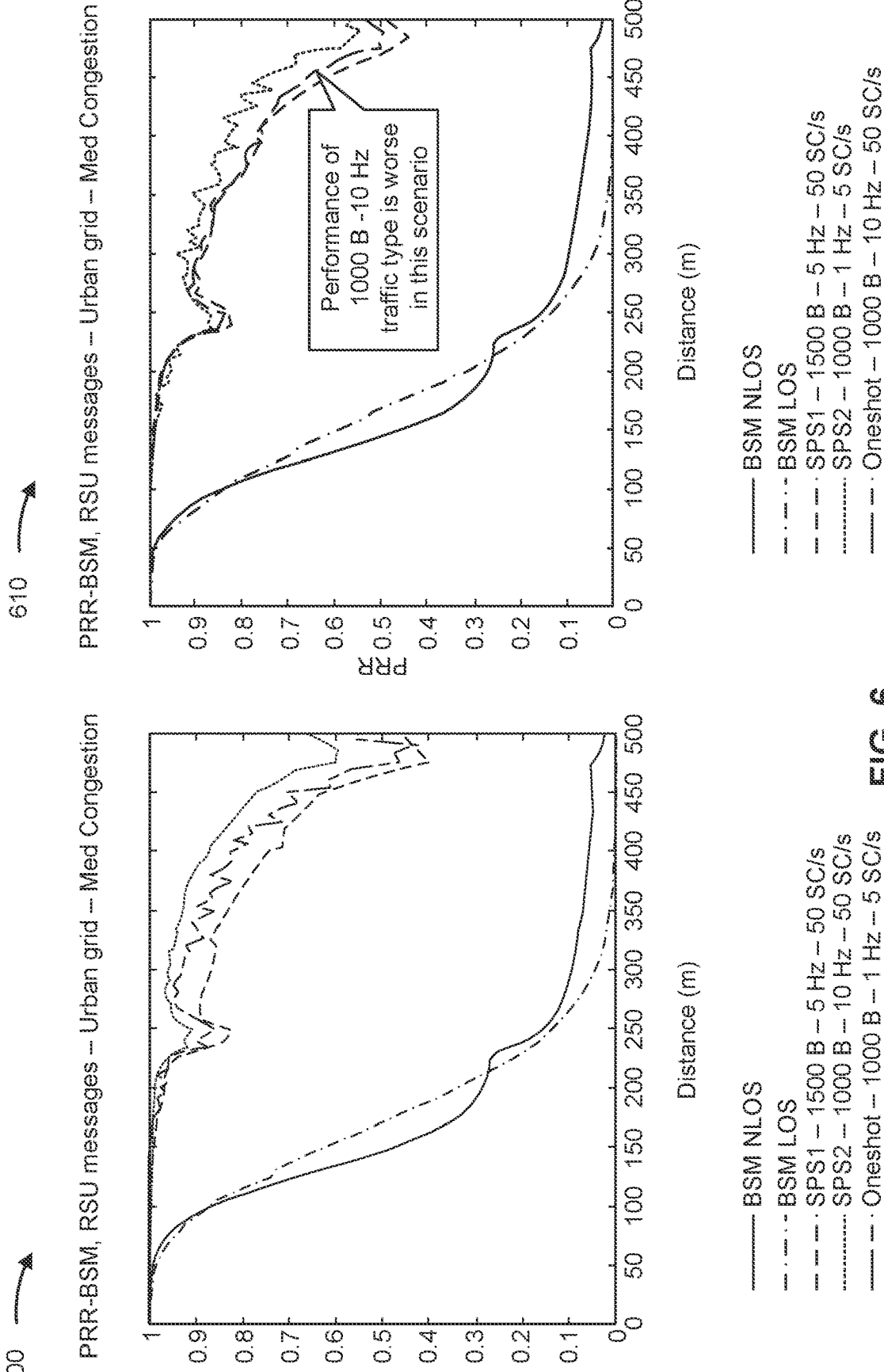
FIG. 6 is a diagram illustrating plots associated with determining a traffic stream with an SPS flow, in accordance with the present disclosure.

FIG. 6 is a diagram illustrating plots 600 and 610 associated with determining a traffic stream with an SPS flow, in accordance with the present disclosure. Both plots 600 and 610 show simulation results for BSM traffic transmitted by vehicles for non-line of sight (NLOS) and line of sight (LOS). Both plots 600 and 610 also show simulation results for three types of messages transmitted by an RSU. A first type of message uses 1500 bytes per message, is sent with a frequency of 5 Hz, and has an NSCRPS ("SC/s") of 50. A second type of message uses 1000 bytes per message, is sent with a frequency of 10 Hz, and has an NSCRPS of 50. A third type of message uses 1000 bytes per message, is sent with a frequency of 1 Hz, and has an NSCRPS of 5.

In the example of plot 600, the RSU assigns the three types of messages (e.g., the three traffic streams) based on techniques described herein. Thus, the RSU determines the first and second message types (which have the highest NSCRPSs) for the two available SPS flows and transmits traffic of the third message type (which has the lowest NSCRPS) via one-shot transmissions. In the example of plot 610, the RSU determines the first and third message types for the two available SPS flows and transmits traffic of the second message type (which has the highest NSCRPS) via one-shot transmissions.

As shown, the performance of traffic of the second message type is improved in plot 600 over the performance of the traffic of the second message type in plot 610. Transmitting traffic of the second message type via an SPS flow (plot 600) rather than one-shot transmissions (plot 610) mitigates packet collisions experienced by the traffic of the second message type associated with one-shot transmissions.

As indicated above, FIG. 6 is provided as an example. Other examples may differ from what is described with respect to FIG. 6.

FIG. 7 is a diagram illustrating an example process 700 performed, for example, by a UE, in accordance with the present disclosure. Example process 700 is an example where the UE (e.g., UE 120) performs operations associated with techniques for determining a traffic stream for an SPS flow.

As shown in FIG. 7, in some aspects, process 700 may include determining a traffic stream, from among a plurality of traffic streams, for an SPS flow of a plurality of SPS flows based at least in part on one or more parameters associated with the traffic stream, wherein the one or more parameters include one or more of a periodicity associated with the traffic stream, a number of frequency resources associated with the traffic stream, or a PPPP value associated with the traffic stream, and wherein a number of the plurality of traffic streams is greater than a number of the plurality of SPS flows (block 710). For example, the UE (e.g., using communication manager 806, depicted in FIG. 8) may determine a traffic stream, from among a plurality of traffic streams, for an SPS flow of a plurality of SPS flows based at least in part on one or more parameters associated with the traffic stream, wherein the one or more parameters include one or more of a periodicity associated with the traffic stream, a number of frequency resources associated with the traffic stream, or a PPPP value associated with the traffic stream, and wherein a number of the plurality of traffic streams is greater than a number of the plurality of SPS flows, as described above.

As further shown in FIG. 7, in some aspects, process 700 may include transmitting traffic of the traffic stream in accordance with the SPS flow (block 720). For example, the UE (e.g., using transmission component 804 and/or communication manager 806, depicted in FIG. 8) may transmit traffic of the traffic stream in accordance with the SPS flow, as described above.

Process 700 may include additional aspects, such as any single aspect or any combination of aspects described below and/or in connection with one or more other processes described elsewhere herein.

In a first aspect, the number of the plurality of SPS flows is two.

In a second aspect, alone or in combination with the first aspect, the one or more parameters include the periodicity associated with the traffic stream, and determining the traffic stream for the SPS flow includes determining the traffic stream for the SPS flow based at least in part on the periodicity associated with the traffic stream being less than another periodicity associated with another traffic stream of the plurality of traffic streams.

In a third aspect, alone or in combination with one or more of the first and second aspects, the one or more parameters include the number of frequency resources associated with the traffic stream, and determining the traffic stream for the SPS flow includes determining the traffic stream for the SPS flow based at least in part on the number of frequency resources associated with the traffic stream being greater than another number of frequency resources associated with another traffic stream of the plurality of traffic streams.

In a fourth aspect, alone or in combination with one or more of the first through third aspects, the frequency resources are resource blocks.

In a fifth aspect, alone or in combination with one or more of the first through fourth aspects, the frequency resources are subchannels.

In a sixth aspect, alone or in combination with one or more of the first through fifth aspects, the one or more parameters include the PPPP value associated with the traffic stream, and determining the traffic stream for the SPS flow includes determining the traffic stream for the SPS flow based at least in part on the PPPP value associated with the traffic stream being less than another PPPP value associated with another traffic stream of the plurality of traffic streams.

In a seventh aspect, alone or in combination with one or more of the first through sixth aspects, the one or more parameters include the number of frequency resources associated with the traffic stream, the number of frequency resources is a number of subchannels associated with the traffic stream, the one or more parameters further include the periodicity associated with the traffic stream, and determining the traffic stream for the SPS flow includes determining the traffic stream for the SPS flow based at least in part on a subchannel rate associated with the traffic stream being higher than another subchannel rate associated with another traffic stream, wherein the subchannel rate is based at least in part on the number of subchannels associated with the traffic stream and the periodicity associated with the traffic stream.

In an eighth aspect, alone or in combination with one or more of the first through seventh aspects, the subchannel rate is a number of subchannels required per second.

In a ninth aspect, alone or in combination with one or more of the first through eighth aspects, determining the traffic stream for the SPS flow includes ranking the plurality of traffic streams based at least in part on respective subchannel rates associated with the plurality of traffic streams.

In a tenth aspect, alone or in combination with one or more of the first through ninth aspects, ranking the plurality of traffic streams includes ranking traffic streams, of the plurality of traffic streams, that are associated with equal subchannel rates based at least in part on priority classifications associated with the traffic streams associated with equal subchannel rates.

In an eleventh aspect, alone or in combination with one or more of the first through tenth aspects, the priority classifications are based at least in part on PPPP values associated with the traffic streams associated with equal subchannel rates.

In a twelfth aspect, alone or in combination with one or more of the first through eleventh aspects, ranking the plurality of traffic streams further includes ranking traffic streams, of the traffic streams associated with equal subchannel rates, that are associated with identical priority classifications based at least in part on periodicities associated with the traffic streams associated with identical priority classifications.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
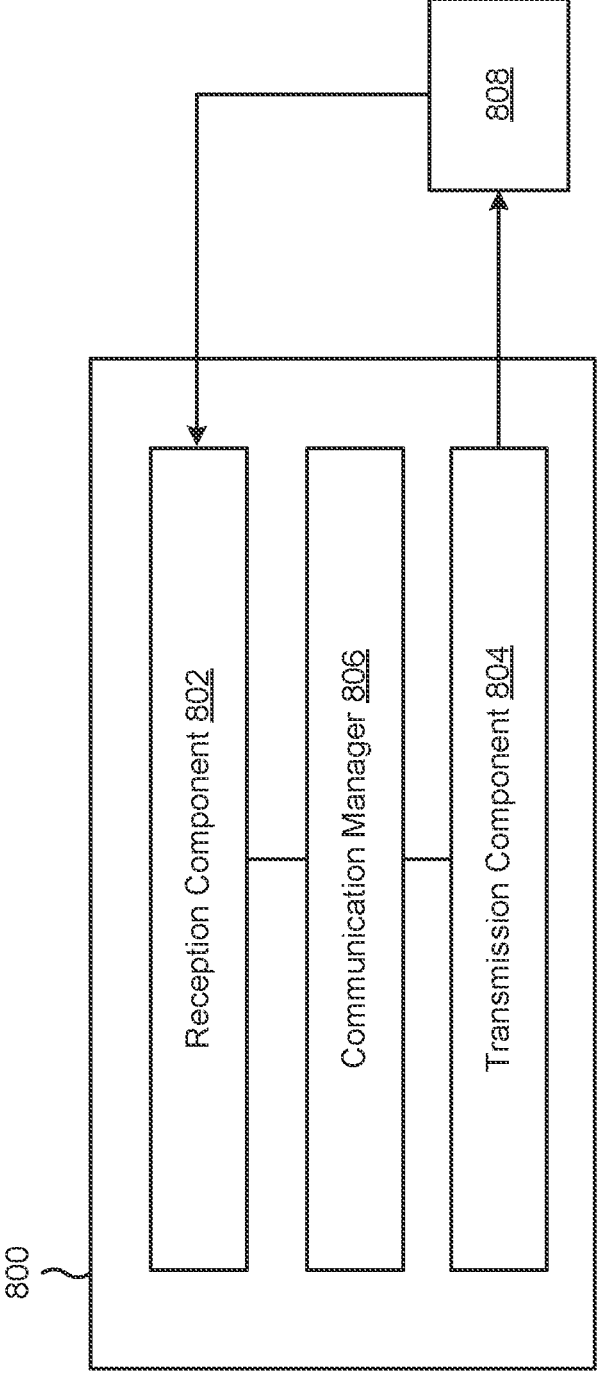
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802, a transmission component 804, and/or a communication manager 806, which may be in communication with one another (for example, via one or more buses and/or one or more other components). In some aspects, the communication manager 806 is the communication manager 140 described in connection with FIG. 1. As shown, the apparatus 800 may communicate with another apparatus 808, such as a UE or a network node (such as a CU, a DU, an RU, or a base station), using the reception component 802 and the transmission component 804.

In some aspects, the apparatus 800 may be configured to perform one or more operations described herein in connection with FIGS. 5 and 6. Additionally, or alternatively, the apparatus 800 may be configured to perform one or more processes described herein, such as process 700 of FIG. 7. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 808. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 808. In some aspects, one or more other components of the apparatus 800 may generate communications and may provide the generated communications to the transmission component 804 for transmission to the apparatus 808. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The communication manager 806 may support operations of the reception component 802 and/or the transmission component 804. For example, the communication manager 806 may receive information associated with configuring reception of communications by the reception component 802 and/or transmission of communications by the transmission component 804. Additionally, or alternatively, the communication manager 806 may generate and/or provide control information to the reception component 802 and/or the transmission component 804 to control reception and/or transmission of communications.

The communication manager 806 may determine a traffic stream, from among a plurality of traffic streams, for an SPS flow of a plurality of SPS flows based at least in part on one or more parameters associated with the traffic stream, wherein the one or more parameters include one or more of a periodicity associated with the traffic stream, a number of frequency resources associated with the traffic stream, or a PPPP value associated with the traffic stream, and wherein a number of the plurality of traffic streams is greater than a number of the plurality of SPS flows. The transmission component 804 may transmit traffic of the traffic stream in accordance with the SPS flow.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
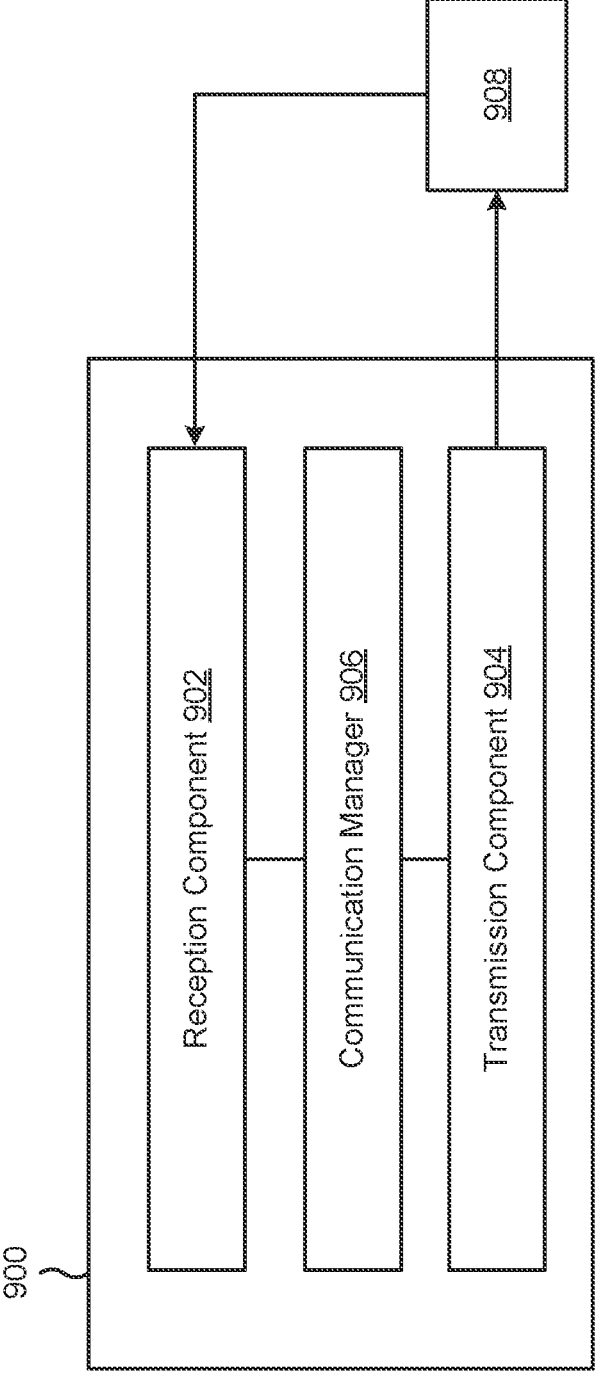
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 150 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 5 and 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2. In some aspects, the reception component 902 and/or the transmission component 904 may include or may be included in a network interface. The network interface may be configured to obtain and/or output signals for the apparatus 900 via one or more communications links, such as a backhaul link, a midhaul link, and/or a fronthaul link.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The communication manager 906 may determine a traffic stream, from among a plurality of traffic streams, for an SPS flow of a plurality of SPS flows based at least in part on one or more parameters associated with the traffic stream, wherein the one or more parameters include one or more of a periodicity associated with the traffic stream, a number of frequency resources associated with the traffic stream, or a PPPP value associated with the traffic stream, and wherein a number of the plurality of traffic streams is greater than a number of the plurality of SPS flows. The transmission component 904 may transmit traffic of the traffic stream in accordance with the SPS flow.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: determining a traffic stream, from among a plurality of traffic streams, for a semi-persistent scheduling (SPS) flow of a plurality of SPS flows based at least in part on one or more parameters associated with the traffic stream, wherein the one or more parameters include one or more of a periodicity associated with the traffic stream, a number of frequency resources associated with the traffic stream, or a proximity service per packet priority (PPPP) value associated with the traffic stream, and wherein a number of the plurality of traffic streams is greater than a number of the plurality of SPS flows; and transmitting traffic of the traffic stream in accordance with the SPS flow.

Aspect 2: The method of Aspect 1, wherein the number of the plurality of SPS flows is two.

Aspect 3: The method of any of Aspects 1-2, wherein the one or more parameters include the periodicity associated with the traffic stream, and wherein determining the traffic stream for the SPS flow includes: determining the traffic stream for the SPS flow based at least in part on the periodicity associated with the traffic stream being less than another periodicity associated with another traffic stream of the plurality of traffic streams.

Aspect 4: The method of any of Aspects 1-3, wherein the one or more parameters include the number of frequency resources associated with the traffic stream, and wherein determining the traffic stream for the SPS flow includes: determining the traffic stream for the SPS flow based at least in part on the number of frequency resources associated with the traffic stream being greater than another number of frequency resources associated with another traffic stream of the plurality of traffic streams.

Aspect 5: The method of Aspect 4, wherein the frequency resources are resource blocks.

Aspect 6: The method of Aspect 4, wherein the frequency resources are subchannels.

Aspect 7: The method of any of Aspects 1-6, wherein the one or more parameters include the PPPP value associated with the traffic stream, and wherein determining the traffic stream for the SPS flow includes: determining the traffic stream for the SPS flow based at least in part on the PPPP value associated with the traffic stream being less than another PPPP value associated with another traffic stream of the plurality of traffic streams.

Aspect 8: The method of any of Aspects 1-7, wherein the one or more parameters include the number of frequency resources associated with the traffic stream, wherein the number of frequency resources is a number of subchannels associated with the traffic stream, wherein the one or more parameters further include the periodicity associated with the traffic stream, and wherein determining the traffic stream for the SPS flow includes: determining the traffic stream for the SPS flow based at least in part on a subchannel rate associated with the traffic stream being higher than another subchannel rate associated with another traffic stream, wherein the subchannel rate is based at least in part on the number of subchannels associated with the traffic stream and the periodicity associated with the traffic stream.

Aspect 9: The method of Aspect 8, wherein the subchannel rate is a number of subchannels required per second.

Aspect 10: The method of Aspect 8, wherein determining the traffic stream for the SPS flow includes: ranking the plurality of traffic streams based at least in part on respective subchannel rates associated with the plurality of traffic streams.

Aspect 11: The method of Aspect 10, wherein ranking the plurality of traffic streams includes: ranking traffic streams, of the plurality of traffic streams, that are associated with equal subchannel rates based at least in part on priority classifications associated with the traffic streams associated with equal subchannel rates.

Aspect 12: The method of Aspect 11, wherein the priority classifications are based at least in part on PPPP values associated with the traffic streams associated with equal subchannel rates.

Aspect 13: The method of Aspect 11, wherein ranking the plurality of traffic streams further includes: ranking traffic streams, of the traffic streams associated with equal subchannel rates, that are associated with identical priority classifications based at least in part on periodicities associated with the traffic streams associated with identical priority classifications.

Aspect 14: An apparatus for wireless communication at a device, comprising a processor; memory coupled with the processor; and instructions stored in the memory and executable by the processor to cause the apparatus to perform the method of one or more of Aspects 1-13.

Aspect 15: A device for wireless communication, comprising a memory and one or more processors coupled to the memory, the one or more processors configured to perform the method of one or more of Aspects 1-13.

Aspect 16: An apparatus for wireless communication, comprising at least one means for performing the method of one or more of Aspects 1-13.

Aspect 17: A non-transitory computer-readable medium storing code for wireless communication, the code comprising instructions executable by a processor to perform the method of one or more of Aspects 1-13.

Aspect 18: A non-transitory computer-readable medium storing a set of instructions for wireless communication, the set of instructions comprising one or more instructions that, when executed by one or more processors of a device, cause the device to perform the method of one or more of Aspects 1-13.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include random access memory (RAM), read-only memory (ROM), electrically erasable programmable ROM (EEPROM), compact disc ROM (CD-ROM) or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes CD, laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in combinations and even initially claimed as such, one or more features from a claimed combination can in some cases be excised from the combination, and the claimed combination may be directed to a subcombination or variation of a subcombination.

Similarly, while operations are depicted in the drawings in an order, this should not be understood as requiring that such operations be performed in the order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A user equipment (UE) for wireless communication, comprising:

one or more memories; and one or more processors, coupled to the one or more memories, configured to:

determine a first traffic stream and a second traffic stream, from among a plurality of traffic streams, for a semi-persistent scheduling (SPS) flow of a plurality of SPS flows based at least in part on one or more parameters associated with at least one traffic stream of the plurality of traffic streams and a subchannel rate corresponding to each of the first traffic stream and the second traffic stream, wherein the subchannel rate is based at least in part on a number of subchannels and a periodicity associated with the at least one traffic stream, and wherein the one or more parameters include a proximity service per packet priority (PPPP) value and the periodicity associated with the at least one traffic stream; and transmit the first traffic stream and the second traffic stream in accordance with the SPS flow.

2. The UE of claim 1, wherein a number of the plurality of SPS flows is two.

3. The UE of claim 1, wherein a first number of frequency resources associated with the first traffic stream include a number of resource blocks.

4. The UE of claim 1, wherein a first number of frequency resources associated with the first traffic stream include another number of subchannels.

5. The UE of claim 1, wherein the one or more parameters include a number of frequency resources associated with the at least one traffic stream.

6. The UE of claim 5, wherein the one or more processors, to determine the first traffic stream and the second traffic stream for the SPS flow, are configured to:

rank the plurality of traffic streams based at least in part on respective subchannel rates associated with the plurality of traffic streams.

7. The UE of claim 6, wherein the one or more processors, to rank the plurality of traffic streams, are configured to:

rank traffic streams, of the plurality of traffic streams, that are associated with equal subchannel rates based at least in part on priority classifications associated with the traffic streams associated with equal subchannel rates.

8. The UE of claim 7, wherein the priority classifications are based at least in part on PPPP values associated with the traffic streams associated with equal subchannel rates.

9. The UE of claim 7, wherein the one or more processors, to rank the plurality of traffic streams, are configured to:

rank the traffic streams associated with equal subchannel rates, that are associated with identical priority classifications based at least in part on periodicities associated with the traffic streams associated with identical priority classifications.

10. The UE of claim 1, wherein the one or more processors are configured to:

determine that two or more traffic streams of the plurality of traffic streams have a same rank; and arbitrarily choose from the two or more traffic streams of the plurality of traffic streams having the same rank for the SPS flow.

11. A method of wireless communication performed by a user equipment (UE), comprising:

determining a first traffic stream and a second traffic stream, from among a plurality of traffic streams, for a semi-persistent scheduling (SPS) flow of a plurality of SPS flows based at least in part on one or more parameters associated with at least one traffic stream of the plurality of traffic streams, and a subchannel rate corresponding to each of the first traffic stream and the second traffic stream, wherein the subchannel rate is based at least in part on a number of subchannels and a periodicity associated with the at least one traffic stream, and wherein the one or more parameters include a proximity service per packet priority (PPPP) value and a periodicity associated with the at least one traffic stream; and transmitting the first traffic stream and the second traffic stream in accordance with the SPS flow.

12. The method of claim 11, wherein a number of the plurality of SPS flows is two.

13. The method of claim 11, wherein the one or more parameters include a number of frequency resources associated with the at least one traffic stream.

14. The method of claim 11, further comprising:

determining that two or more traffic streams of the plurality of traffic streams have a same rank; and arbitrarily choosing from the two or more traffic streams of the plurality of traffic streams having the same rank for the SPS flow.

15. The method of claim 11, further comprising:

ranking the plurality of traffic streams based at least in part on respective subchannel rates associated with the plurality of traffic streams.

16. The method of claim 11, further comprising:

ranking traffic streams, of the plurality of traffic streams, that are associated with equal subchannel rates based at least in part on priority classifications associated with the traffic streams associated with equal subchannel rates.

17. A non-transitory computer-readable medium storing a set of instructions for wireless communication, the set of instructions comprising:

one or more instructions that, when executed by one or more processors of a user equipment (UE), cause the UE to:

determine a first traffic stream and a second traffic stream, from among a plurality of traffic streams, for a semi-persistent scheduling (SPS) flow of a plurality of SPS flows based at least in part on one or more parameters associated with at least one traffic stream of the plurality of traffic streams, and a subchannel rate corresponding to each of the first traffic stream and the second traffic stream, wherein the subchannel rate is based at least in part on a number of subchannels and a periodicity associated with the at least one traffic stream, and wherein the one or more parameters include a proximity service per packet priority (PPPP) value and a periodicity associated with the at least one traffic stream; and transmit the first traffic stream and the second traffic stream in accordance with the SPS flow.

18. The non-transitory computer-readable medium of claim 17, wherein a number of the plurality of SPS flows is two.

19. The non-transitory computer-readable medium of claim 17, wherein the one or more parameters include a number of frequency resources associated with the at least one traffic stream.

20. The non-transitory computer-readable medium of claim 17, wherein the one or more instructions cause the UE to:

determine that two or more traffic streams of the plurality of traffic streams have a same rank; and arbitrarily choose from the two or more traffic streams of the plurality of traffic streams having the same rank for the SPS flow.

21. The non-transitory computer-readable medium of claim 17, wherein the one or more instructions cause the UE to:

rank the plurality of traffic streams based at least in part on respective subchannel rates associated with the plurality of traffic streams.

22. The non-transitory computer-readable medium of claim 17, wherein the one or more instructions cause the UE to:

rank traffic streams, of the plurality of traffic streams, that are associated with equal subchannel rates based at least in part on priority classifications associated with the traffic streams associated with equal subchannel rates.

23. An apparatus for wireless communication, comprising:

means for determining a first traffic stream and a second traffic stream, from among a plurality of traffic streams, for a semi-persistent scheduling (SPS) flow of a plurality of SPS flows based at least in part on one or more parameters associated with at least one traffic stream of the plurality of traffic streams, and a subchannel rate corresponding to each of the first traffic stream and the second traffic stream, wherein the subchannel rate is based at least in part on a number of subchannels and a periodicity associated with the at least one traffic stream, and wherein the one or more parameters include a proximity service per packet priority (PPPP) value and a periodicity associated with the at least one traffic stream; and means for transmitting the first traffic stream and the second traffic stream in accordance with the SPS flow.

24. The apparatus of claim 23, wherein a number of the plurality of SPS flows is two.

25. The apparatus of claim 23, further comprising:

means for determining that two or more traffic streams of the plurality of traffic streams have a same rank; and means for arbitrarily choosing from the two or more traffic streams of the plurality of traffic streams having the same rank for the SPS flow.

26. The apparatus of claim 23, wherein a first number of frequency resources associated with the first traffic stream include a number of resource blocks.

27. The apparatus of claim 23, wherein a first number of frequency resources associated with the first traffic stream include another number of subchannels.

28. The apparatus of claim 23, wherein the one or more parameters include a number of frequency resources associated with the at least one traffic stream.

29. The apparatus of claim 23, further comprising:

means for ranking the plurality of traffic streams based at least in part on respective subchannel rates associated with the plurality of traffic streams.

30. The apparatus of claim 23, further comprising:

means for ranking traffic streams, of the plurality of traffic streams, that are associated with equal subchannel rates based at least in part on priority classifications associated with the traffic streams associated with equal subchannel rates.

* * * * *